3,636,084
SEDATIVE COMPOSITIONS
Michel L. Delalande, Paris France, assignor to Delalande S.A., Courbevoie, Hauts-de-Seine, France
No Drawing. Continuation-in-part of application Ser. No. 567,861, July 26, 1966, now Patent No. 3,527,788. This application Apr. 15, 1968, Ser. No. 721,170
Claims priority, application France, Apr. 17, 1967, 103,026
Int. Cl. C07c *125/04*
U.S. Cl. 260—482 C 2 Claims

ABSTRACT OF THE DISCLOSURE

A compound which has tranquilizing and myo-relaxing properties and which is represented by the formula:

$$\begin{array}{c} CH_2-O-(CH_2)_n-C\equiv CH \\ | \\ H-C-R_2 \\ | \\ CH_2-O-R_3 \end{array}$$

in which $n$ is an integer from one to four inclusive, $R_2$ is a hydroxyl or carbamoyloxy ($OCONH_2$) radical and $R_3$ is a saturated or unsaturated, straight or branched-chain hydrocarbon radical having one to seven carbon atoms, which radical may be halogen substituted or a substituted phenyl radical.

---

This application is a continuation-in-part of my copending application Ser. No. 567,861, filed July 26, 1966, now Pat. No. 3,527,788.

In our co-pending patent application No. 567,861, now Pat. No. 3,527,788, compounds have been described as new medicines corresponding to the general formula:

$$\begin{array}{c} CH_2-O-(CH_2)_n-C\equiv CH \\ | \\ R_1-C-R_2 \\ | \\ CH_2-O-R_3 \end{array}$$

wherein $n$ is an integer from 1 to 4 inclusive $R_1$ is a hydrogen atom or a methyl radical $R_2$ is a hydrogen atom, a hydroxyl, carbamoyloxy ($OCONH_2$) or an alkyl radical having 1 to 5 carbon atoms, and $R_3$ is a hydrogen atom, a saturated or unsaturated, straight or branched-chain hydrocarbon radical having 1 to 7 carbon atoms, e.g., methyl, ethyl, propyl, isopropyl, n-butyl, sec-butyl, iso-butyl or amyl, an alkenyl radical or a propargyl radical, a cyclo-alkyl radical, e.g., cyclopentyl or cyclohexyl or $R_3$ is a halogenated alkyl radical e.g. 2-chloro or 2-bromoethyl, 3-chloro or 3-bromopropyl, 4-chloro or 4-bromo butyl radical, a carbamyl radical, an alkylamino radical of formula $-(CH_2)_mR_4$ where $m$ is an integer from 1 to 4 and $R_4$ is a tertiary aliphatic or heterocyclic amino group, an alkyl nitrile radical of formula $-(CH_2)_p-C\equiv N$, where $p$ is 2, 3 or 4, an alkaryl radical of formula $$-X-\underset{R_5}{\overset{R_6}{\bigcirc}}$$

where X is a saturated or unsaturated, straight or branched-chain bivalent hydrocarbon having 1 to 4 carbon atoms, an aryl radical of formula $$\underset{R_5}{\overset{R_6}{\bigcirc}}$$

where $R_5$ and $R_6$, which may be the same or different, are each a hydrogen atom, an alkoxy radical, a halogen atom, a $C_1$–$C_5$ saturated or unsaturated aliphatic radical, or a trifluoromethyl radical, or $R_3$ can be an α or β-naphthyl radical.

Many compounds corresponding to this general formula have been described and listed in our co-pending application No. 567,861. The present invention concerns new compounds which have been prepared, which compounds correspond to the above general formula, in which $R_1$ is a hydrogen atom, $R_2$ is a hydroxyl or carbamoyloxy radical; and $R_3$ is a saturated or unsaturated, straight or branched-chain hydrocarbon radical having 1 to 7 carbon atoms, which radical may be halogen-substituted or a substituted phenyl radical.

The phenyl radical may for example be substituted by halogen atoms, or methoxy, acetyl or propionyl radicals.

The new compounds according to the invention may be prepared according to the methods of operation described in our co-pending application No. 567,861. The following examples illustrate the preparation of some of these compounds:

Example 1.—1 - propargyloxy-3-n-heptyloxy-2-propanol 1 mol of 1-propargyloxy-2.3-epoxy-propane are added drop by drop to a mixture of 3 mols of n-heptanol and 3 ml. of a 0.3% solution of boron trifluoride in ether, whilst keeping the temperature between 60 and 70° C. and agitating the mixture.

The mixture is left in contact for 20 minutes, cooling is effected and then 20 ml. of water are added. The excess heptanol is driven off under reduced pressure. The product obtained is distilled under 0.1 mm. Hg at 120° C.

Example 2.—1 - propargyloxy - 3 - p - fluorophenoxy-2-propanol

A solution of sodium p-fluorophenate (1.3 mol of p-fluoro phenol+0.9 mol NaOH+300 ml. water) is prepared to which 1-propargyloxy-2.3-epoxy-propane is added.

The mixture is kept at 60° C. for 2 hours. It is then allowed to cool and is extracted twice in ether. The ether solution is washed with dilute soda and then twice with water.

After elimination of the solvent, the product is distilled under 0.01 mm. Hg at 130° C.

Example 3.—1 - propargyloxy-3-(4-methoxyphenoxy)-2-carbamyloxy-propane 1 mol of 1-propargyloxy-3-(4-methoxyphenoxy)-2-propanol is treated with a toluenic solution of phosgene (1.5 mol) in the presence of 1 mol of diethylaniline. The temperature rises rapidly up to about 60–65° C.; after 1 hour of contact at this temperature cooling is effected and 50 ml. water is added.

The excess phosgene is eliminated. The chlorocarbonate thus obtained is treated directly by a current of gaseous ammonia for 2–3 hours.

The toluene solution is washed in water. The solvent is eliminated and the crystallised product is obtained M.P.=94° C.

Various compounds obtained by the present invention are listed in the following Tables I and II. The first three compounds of Table I were prepared according to the method of operation described in Example 1 above, whilst the five other compounds in the same table were prepared according to the mode of operation described in Example 2. The preparation of the compounds of Table 2 was effected in every case according to the mode of operation described in Example 3.

TABLE I

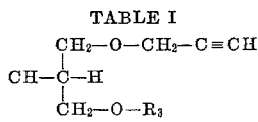

| R$_3$ | No. | Molecular formula | Molecular weight | E/P | N$_D^{20}$ | F. °C. | Calculated C | H | O | N | Cl | Found C | H | O | N | Cl |
|---|---|---|---|---|---|---|---|---|---|---|---|---|---|---|---|---|
| (CH)$_2$—CH(CH$_3$)$_2$ | 6740 | C$_{11}$H$_{20}$O$_3$ | 200.27 | 106/0.01 | 1.4496 | | 65.07 | 10.07 | | | | 66.01 | 10.08 | | | |
| (CH$_2$)$_5$—CH$_3$ | 6741 | C$_{12}$H$_{22}$O$_3$ | 214.30 | 107/0.01 | 1.4518 | | 67.25 | 10.35 | | | | 67.07 | 10.23 | | | |
| (CH$_2$)$_6$—CH$_3$ | 6742 | C$_{13}$H$_{24}$O$_3$ | 228.32 | 120/0.1 | 1.4520 | | 68.38 | 10.59 | | | | 68.22 | 10.54 | | | |
| 4-(F—)C$_6$H$_4$ | 66256 | C$_{12}$H$_{13}$PO$_3$ | 224.23 | 130/0.01 | 1.5119 | | 64.28 | 5.84 | | | (1) | 64.43 | 6.01 | | | (2) |
| 4(OCH$_3$)—C$_6$H$_4$ | 66260 | C$_{13}$H$_{16}$O$_4$ | 236.26 | 160/0.01 | 1.5299 | | 65.08 | 6.83 | 27.09 | | | 66.13 | 6.70 | 27.34 | | |
| 2.6(CCH$_3$)C$_6$H$_3$ | 6708 | C$_{14}$H$_{18}$O$_3$ | 266.28 | 180/0.01 | | | 63.14 | 6.81 | | | | 63.25 | 6.96 | | | |
| 2.4.5(iC$_3$H$_7$)(Cl)(CH$_3$)C$_6$H$_2$ | 6710 | C$_{16}$H$_{21}$ClO$_3$ | 296.78 | 175/0.01 | 1.5273 | | 64.75 | 7.13 | | | | 64.80 | 7.15 | | | |
| 4-(O$_6$H$_4$)—C$_6$H$_4$ | 6702 | C$_{18}$H$_{18}$O$_3$ | 282.32 | | | 73 | 76.57 | 6.43 | | | | 76.58 | 6.63 | | | |

1 F=8.47.
2 F=8.63.

TABLE II

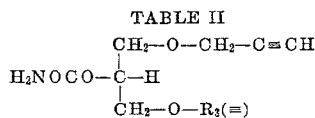

| R$_3$ | No. | Molecular formula | Molecular weight | E/p | N$_D^{20}$ | °C. | Calculated C | H | O | N | Cl | Found C | H | O | N | Cl |
|---|---|---|---|---|---|---|---|---|---|---|---|---|---|---|---|---|
| (CH$_2$)$_3$Cl | 6755 | C$_{10}$H$_{16}$ClNO$_4$ | 249.69 | | | 55 | 48.10 | 6.46 | | 5.61 | | 48.21 | 6.50 | | 5.60 | |
| (CH$_2$)$_4$Cl | 6756 | C$_{11}$H$_{18}$ClNO$_4$ | 263.72 | | | 60 | 50.09 | 6.88 | | 5.31 | | 51.12 | 6.76 | | 5.29 | |
| (CH$_2$)$_2$—CH—(CH$_3$)$_2$ | 6744 | C$_{12}$H$_{21}$NO$_4$ | 243.30 | 157/0.01 | 1.4537 | | 59.34 | 3.70 | | 5.76 | | 59.26 | 8.76 | | 5.94 | |
| (CH$_2$)$_5$—CH$_3$ | 6748 | C$_{13}$H$_{23}$NO$_4$ | 257.32 | | | 50 | 60.57 | 9.01 | | 5.44 | | 60.49 | 6.98 | | 5.50 | |
| (CH$_2$)$_3$—CH$_3$ | 6749 | C$_{14}$H$_{25}$NO$_4$ | 271.35 | | | 50 | 61.96 | 9.29 | | 5.16 | | 62.01 | 9.35 | | 5.26 | |
| 4(Ol)—C$_6$H$_4$ | 66255 | C$_{13}$H$_{14}$ClNO$_4$ | 283.71 | | | 94 | 35.03 | 4.97 | 22.56 | 4.94 | 12.49 | 55.15 | 8.15 | 22.42 | 4.82 | 12.32 |
| 4(F)—C$_6$H$_4$ | 6709 | C$_{13}$H$_{14}$FNO$_4$ | 267.25 | | | 54 | 58.42 | 5.28 | | 5.24 | (1) | 58.60 | 5.47 | | 5.35 | (2) |
| 4(OCH$_3$)—C$_6$H$_4$ | 6701 | C$_{14}$H$_{17}$NO$_5$ | 279.28 | | | 94 | 60.20 | 6.14 | | 5.03 | | 60.39 | 6.23 | | 5.13 | |
| 2.6.(OCH$_3$)C$_6$H$_3$ | 6716 | C$_{15}$H$_{19}$NO$_5$ | 309.31 | | | 95 | 58.24 | 6.19 | | 4.53 | | 58.42 | 6.30 | | 4.67 | |
| 4(CO—CH—CH$_3$)C$_6$H$_4$ | 66259 | C$_{16}$H$_{19}$NO$_5$ | 305.32 | | | 74 | 62.94 | 6.27 | 26.20 | 4.59 | | 62.85 | 6.28 | 25.38 | 4.69 | |
| 4(C$_6$H$_4$)—C$_6$H$_4$ | 6723 | C$_{19}$H$_{19}$NO$_4$ | 325.350 | | | | 70.14 | 5.83 | | 4.31 | | 70.21 | 5.79 | | 4.30 | |
| 2.4.5(iC$_3$H)(Cl)(CH$_3$)C$_6$H$_2$ | 6750 | C$_1$H$_{22}$NO$_4$Cl | 339.81 | | | 86 | 60.08 | 6.53 | | 4.12 | | 61.15 | 6.60 | | 4.09 | |

1 F=7.19.
2 F=6.97.

The new compounds forming the object of the present invention have the same pharmacological and medical properties as the derivatives of the same general formula described in our co-pending application No. 567,861. They have been tested on animals and have proved to be of particular interest in that they have tranquilising and myo-relaxing properties without having any hypnotic, curarising or neuroleptic activity.

QUALITATIVE ASPECT

(1) Action on behaviour

Oral or parenteral administration of these substances on mice, rats, guinea pigs, cats and dogs is first followed by a slight excitation due to an "alcohol effect" which is found with numerous tranquilisers, then a slowing down of spontaneous activity, then a lowering of muscular tone with ataxia and finally paralysis of voluntary motivity of increasing type without respiration being appreciably affected. In this stage the posture reflex is lost. The recovery of this reflex is very rapid but a basic of prolonged sedation persists with reduction of activity and reactivity to external stimuli.

(2) Tranquilising action

The substances indicated show a tranquilising action in the course of numerous tests such as hyperactivity of investigation, the drilled plank, evasion, the toxicity of amphetamine group, potentialisation and reinduction of barbiturates and chloral and aggressiveness induced by electric stimulation.

(3) Anti-convulsivant action

Oral or parenteral administration of these substances on mice and rats, prevents convulsions due to cardiazol, strychnine or electric shock. The chlonic phase is suppressed or diminished, according to the dose; the tonic phase is suppressed whilst mortality is abolished.

Among mice, it is possible to observe the curvative action of these substances, the sub-cutaneous or intravenous injection of which stops convulsive crises started by cardiazol and strychnine.

(4) Myo-relaxing action

The stated substances are capable of depressing the polysynaptic medullar reflexes such as the homolateral reflex of flexing and the reflex of crossed extension. On the other hand, the monosynaptic reflexes, such as the patelliary reflex are not depressed except after very large doses. Proof of this was obtained from the slightly anesthetised cat.

Similarly with mice, the pineal reflex is suppressed by these substances in doses less than those which suppress the corneal reflex.

The described substances are capable of abolishing the state of muscular rigidity by the section of the mesencephalus.

They are also capable of modifying the grid test.

(5) Absence of hypnotic action

These substances have no hypnotic activity, as demonstrated by electro-encephalographic studies.

(6) Absence of curarisant action

These substances do not block neuro-muscular transmission to the level of the motor plate, as proved by experiments on frogs (sciatic-gastroenemian preparation) and on rabbits (anterior sciatic tibial preparation).

(7) Absence of neuroleptic action

These substances do not modify agility measured by tests of the turning rod and traction, except in doses close to the ataxix dose. Their hypothermising power is weak.

QUANTITATIVE ASPECT

By way of example the following Table III shows results in mg./kg. obtained in the course of various tests with products No. 66255, 6701 and 6716 of Table II. The methods followed for obtaining results shown in figures in Table III are as follows:

Determination orally on mice of acute toxicity approximated on reduced lots.

Reduction of agility on a rod turning at a constant speed of 10 revolutions per minute by determining the oral dose causing the fall of 50% of the animals in less than 3 minutes.

Determination with mice of the oral dose protecting 50% of the animals from death caused by a fatal dose of strychnine for 95% of the animals.

Same determination with cardiazol.

Determining on mice the oral dose causing sleep of 50% of the animals given a small dose of Penthiobarbital capable by itself of causing sleep of 10% of the animals only.

Determining the oral dose reducing by half displacements measured in a photo-electric cell cage on mice in a phase of hypermotility of investigation.

Determining with mice the oral dose inhibiting the pineal reflex (shaking reflex of the ear obtained by means of hair at the inlet of the auditory canal) on 30% of the animals.

Determining the oral dose causing loss of the posture reflux on 50% of animals.

TABLE III

| Toxicity | Turning rod | Convulsions strychnine | Convulsions cardiazol | Potentialisation penthiobarbital | Pineal reflex | Hypo-motilic | Loss of posture reflex |
|---|---|---|---|---|---|---|---|
| 1.200 | 210 | 120 | 125 | 212 | 600 | 550 | 650 |
| >1.600 | 900 | 340 | 510 | 800 | >1.600 | 400 | >1.600 |
| 1.200 | 275 | 210 | 300 | 250 | 425 | 300 | 400 |

Note.—Abbreviation used: > dose greater than.

TABLE OF DOSAGE

| Patients | Method of administration | Form of pharmaceutical | Amount of the active medicament per dose | Number of doses per day |
|---|---|---|---|---|
| Adults | Oral | Tablets, capsules, all other forms used for this method. | 200 to 400 mg | Mild case: 1 to 4, serious case: 4 to 8. |
| | Rectal | Suppositories | 400 mg | 2 to 4. |
| | Intramuscular. | Ampoules | 200 to 400 mg. in solution. | 2 to 10. |
| | Locally | Cream, dermal ointment. | 10% concentration in penetrating excipient. | |
| Infants | Oral | Tablets, capsules, all other forms used for this method. | 100 to 200 mg | 1 to 4. |
| | Rectal | Suppositories | 100 to 200 mg | 1 to 4. |

The embodiments of the invention in which an exclusive property or privilege is claimed are defined as follows:

1. Compound of the formula:

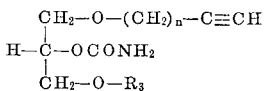

in which $n$ is an integer from one to four inclusive, $R_3$ is (A) a saturated or unsaturated, straight or branched-chain hydrocarbon radical having one to seven carbon atoms, which radical may be halogen substituted or (B) a phenyl radical substituted by halogen, methoxy, acetyl, or propionyl.

2. Compound according to claim 1, in which $n$ is one, and $R_3$ is selected from the group consisting of 4-fluorophenyl and 4-chlorophenyl.

References Cited

UNITED STATES PATENTS 3,401,120  9/1968  Chiddix et al. _____ 260—615 X

LORRAINE A. WEINBERGER, Primary Examiner

P. J. KILLOS, Assistant Examiner

U.S. Cl. X.R.

260—465.6, 613 D, 615 D; 424—300